(12) United States Patent
Takabayashi

(10) Patent No.: US 7,021,754 B2
(45) Date of Patent: Apr. 4, 2006

(54) INK-JET RECORDING METHOD

(75) Inventor: Toshiyuki Takabayashi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/426,524

(22) Filed: Apr. 30, 2003

(65) Prior Publication Data

US 2003/0222960 A1 Dec. 4, 2003

(30) Foreign Application Priority Data

May 15, 2002 (JP) ............................. 2002-140105
Jun. 21, 2002 (JP) ............................. 2002-181451

(51) Int. Cl.
*B41J 2/01* (2006.01)

(52) U.S. Cl. ..................... 347/102; 347/101; 347/100

(58) Field of Classification Search ................ 347/102, 347/100, 101, 96, 95; 106/31.6, 31.13, 31.27; 523/160

See application file for complete search history.

(56) References Cited

U.S. PATENT DOCUMENTS

| | | | | |
|---|---|---|---|---|
| 5,721,020 A | * | 2/1998 | Takami et al. | 427/508 |
| 5,889,084 A | * | 3/1999 | Roth | 523/161 |
| 5,977,207 A | * | 11/1999 | Yui et al. | 523/160 |
| 6,145,979 A | * | 11/2000 | Caiger et al. | 347/102 |
| 6,232,361 B1 | * | 5/2001 | Laksin et al. | 106/31.6 |
| 6,312,123 B1 | * | 11/2001 | Codos et al. | 347/102 |
| 6,471,318 B1 | * | 10/2002 | Fujii | 347/9 |
| 6,528,127 B1 | * | 3/2003 | Edlein et al. | 427/494 |
| 2003/0112307 A1 | * | 6/2003 | Maeda et al. | 347/102 |

FOREIGN PATENT DOCUMENTS

| | | | |
|---|---|---|---|
| JP | 8-143806 | | 6/1996 |
| JP | 08-143806 | * | 6/1996 |
| JP | 2001-040205 | * | 2/2001 |
| JP | 2002-137375 | * | 5/2002 |

OTHER PUBLICATIONS

British Search Report GB 0310210.0.

* cited by examiner

*Primary Examiner*—Manish S. Shah
(74) *Attorney, Agent, or Firm*—Lucas & Mercanti, LLP

(57) ABSTRACT

The present invention relates to an ink-jet recording method including: jetting an active ray-hardenable ink from an ink-jet head onto a recording material; irradiating the jetted active ray-hardenable ink on the recording material with an active ray; and heating the jetted active ray-hardenable ink on the recording material, wherein the active ray-hardenable ink includes an oxetane compound having one oxetane ring in the molecule and an oxetane compound having two or more oxetane rings in the molecule as a photo polymerizable compound.

13 Claims, 4 Drawing Sheets

INK-JET RECORDING METHOD

TECHNICAL FIELD

The present invention relates to an ink-jet recording method, by which a very minute image can be stably reproduced on any kind of recording material even under various printing environments.

BACKGROUND

Recently, because the ink-jet recording method can produce an image simply and at low cost, it is applied to various printing fields such as photography, each kind of printing, and special printing such as marking and color filter. Particularly, for the recording apparatus by which a fine dot is jetted and controlled, the ink whose color reproduction area, durability, and jetting property are improved, and an exclusive use sheet in which the adsorptivity of the ink, coloring property of the coloring material, surface glossiness are greatly increased, are used, and the image quality equal to the silver halide photograph can be obtained. The increase of the image quality of today's ink-jet recording system is attained only when all of the exclusive recording apparatus, the exclusive ink, and exclusive recording sheet are present.

However, in the ink-jet system for which the exclusive recording sheet is necessary, the recording medium is limited and the cost up of the recording medium become a problem. Accordingly, many trials to record onto the recording medium different from the exclusive recording sheet by the ink-jet system are made. Specifically, a phase-changing ink-jet system in which a wax ink being solid at a room temperature is used, a solvent type ink-jet system in which the ink in which a quick dry type organic solvent is a main component, is used, or a UV ink-jet system in which, after the recording, a bridge is formed by the ultra violet ray (UV).

In them, the UV ink-jet system is comparatively low odious smell comparing to the solvent type ink-jet system, and for the point which can record onto the recording medium not having the quick dry property and ink adsorptivity, it is being remarked recently, and for example, in Japanese Examined Patent Publication No. H5-54667, Japanese Unexamined Patent Application Publication No. H6-200204, and Japanese Translation of PCT Publication No. 2000-504778, the ultraviolet ray hardenable ink-jet ink is disclosed.

However, even when these inks are used, because a dot diameter after an ink impact is largely changed due to the kind of the recording material or the working environment, it is impossible to form the highly minute image onto all the recording materials.

For example, as this ultraviolet ray hardenable ink, there are a radical polymerization type ultraviolet ray hardenable ink and a cation polymerization type ultraviolet ray hardenable ink, centering around the acrylic component.

The radical polymerization type ultraviolet ray hardenable ink has a problem in which, in its polymerization mechanism, the hardening property is decreased because it is subjected to the oxygen inhibition action under the environment in which the oxygen is present. On the one hand, although the cation polymerization type ultraviolet ray hardenable ink is not subjected to the oxygen inhibition action, in the nature of the polymerization reaction, there is a problem in which it is easily subjected to the influence of water(humidity) of the molecular level.

Further, the ink used for the conventional ultraviolet ray hardenable ink-jet system sometimes has a problem in the safety such as skin irritation, causing sensitivity, or abnormal chromosome, and particularly, in the soft package printing or label printing including the food package, the actual situation is that the active ray hardenable ink-jet system is difficult to come to practical use.

SUMMARY

In view of the above-described problems, the present invention is attained. An aspect of the present invention is to provide an ink-jet recording method in which the character quality is excellent, color mixing is not generated, and by which a high minute image can be very stably recorded.

The above-described aspects can be achieved by the following structures.

An ink-jet recording method comprising:
jetting an active ray-hardenable ink from an ink-jet head onto a recording material;
irradiating the jetted active ray-hardenable ink on the recording material with an active ray; and
heating the jetted active ray-hardenable ink on the recording material. Further, the active ray-hardenable ink comprises an oxetane compound having one oxetane ring in the molecule and an oxetane compound having two or more oxetane rings in the molecule as a photo polymerizable compound.

When the ink-jet recording is conducted according to the above-described structure, the ink can be stably jetted, and the control of the dot diameter after the ink impact can be easily conducted, and the high quality image can be formed.

DETAILED DESCRIPTION OF THE PRESENT INVENTION

Figure 1:
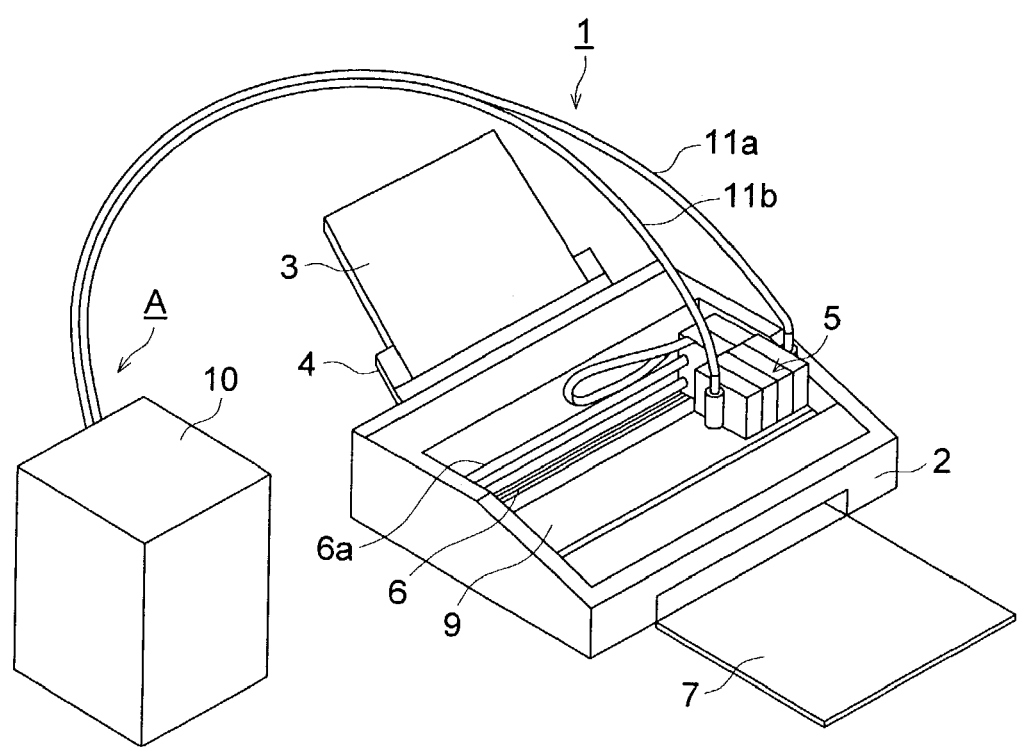
FIG. 1 is a perspective view of the whole of an ink-jet printer, which has a heating device and is usable in the present invention.

The present invention will be detailed below. In the ink-jet recording method of the present invention, after the ink composition is jetted onto the recording material by the ink-jet recording system, and the drawing or printing is conducted, when the active ray such as the ultraviolet ray is irradiated and the ink is heated, the printed ink is hardened.

The active ray-hardenable ink used in the invention has one feature in which it comprises an oxetane compound having one oxetane ring in the molecule and an oxetane compound having 2 or more oxetane rings in the molecule, as the photo polymerizable compound.

Further, it is preferable that the active ray-hardenable ink used in the invention comprises the oxetane compound having one oxetane ring in the molecule in an amount of 5 to 50 weight % of the total ink weight and comprises the oxetane compound having two or more oxetane rings in the molecule in an amount of 4 to 80 weight % of the total ink weight.

When the active ray hardenable ink composed of the above-described structure according to the present invention is used, the ink can be stably jetted, and the control of the dot diameter after the ink impact can be easily conducted, and the high quality image can be formed.

Further, in the ink-jet recording method of the present invention, it is preferable that the active ray-hardenable ink comprises a photo acid generating agent and comprises no photo polymerizable compound other than the oxetane compounds. As the result of that, the curl or wrinkle of the recording material by the ink shrinkage caused at the time of ink hardening can be greatly reduced.

Still further, when only the oxetane compound is used as the photo polymerizable compound in the ink, the fluctuation of the jetting property by the printing environment (temperature, humidity) which is a problem in the inkjet recording method, is greatly improved.

The oxetane compound in the present invention is the compound having the oxetane ring, and all oxetane compounds which are publicly known as introduced in Japanese Unexamined Patent Application Publication No. 2001-220526, and Japanese Unexamined Patent Application Publication No. 2001-310939, can be used.

As the oxetane compound used in the present invention, the oxetane compounds having 1 to 4 oxetane rings is preferably used. By selecting the oxetane compound used in the invention from the oxetane compounds having 1 to 4 oxetane rings, the viscosity and the glass transition temperature of the ink can be optimized, and it results in that the handling easiness of the ink composition is improved and the ink having a sufficient stickiness can be obtained.

Specific example of the compounds having the oxetane ring according to the present invention will be described below, however, the present invention is not limited to them.

As an example of the compound having one oxetane ring in the molecule, the compounds shown by the following General Formula (1) are listed.

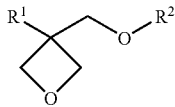

General Formula (1)

In the General Formula (1), $R^1$ is hydrogen atom or alkyl group of number of carbons of 1–6, such as methyl group, ethyl group, propyl group, or butyl group, fluoro alkyl group of number of carbons of 1–6, allyl group, aryl group, furyl group or thienyl group. $R^2$ is alkyl group of number of carbons 1–6 such as methyl group, ethyl group, propyl group, or butyl group, alkenyl group of number of carbons 2–6 such as 1-propenyl group, 2-propenyl group, 2-methyl-1 propenyl group, 2-methyl-2-propenyl group, 1-buthenyl group, 2-buthenyl group, or 3 buthenyl group, a group having the aromatic ring such as phenyl group, benzyl group, fluoro benzyl group, methoxy benzyl group, or phenoxy ethyl group, alkyl carbonyl group of number of carbons 2–6, such as ethyl carbonyl group, propyl carbonyl group, or butyl carbonyl group, alkoxy carbonyl group of number of carbons 2–6, such as ethoxy carbonyl group, propoxy carbonyl group, or buthoxy carbonyl group, or N-alkyl carbamoyl group of number of carbons 2–6, such as ethyl carbamoyl group, propyl carbamoyl group, butyl carbamoyl group or pentyl carbamoyl group. As the oxetane compound used in the present invention, it is particularly preferable that the compound having one oxetane ring is used, because the obtained composition is excellent in the stickiness and it is excellent in the operability in the low viscosity.

As an example of the compound having 2 oxetane rings in the molecule, the compounds shown by the following General Formula (2) are listed.

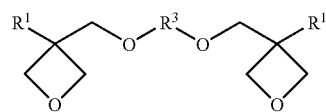

General Formula (2)

In the General Formula (2), $R^1$ is the same meaning as $R^1$ in the General Formula (1). $R^3$ is a linear or branched chain alkylene group such as ethylene group, propylene group or butylene group, linear or branched chain poly (alkylene oxy) group, such as poly (ethylene oxy) group or poly (propylene oxy)group, linear or branched chain unsaturated hydrocarbon group, such as propenylene group, methyl propenylene group or butenylen group, or carbonyl group, or alkylene group including carbonyl group, alkylene group including carboxyl group, or alkylene group including carbamoyl group.

Further, as $R^3$, a polyvalent group selected from the groups shown by the following General Formulas (3), (4), and (5) can also be listed.

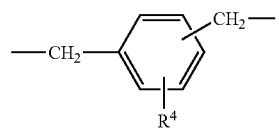

General Formula (3)

In the General Formula (3), $R^4$ is hydrogen atom, or alkyl group of number of carbons 1–4 such as methyl group, ethyl group, propyl group, butyl group, alkoxy group of number of carbons of 1–4 such as methoxy group, ethoxy group, propoxy group, butoxy group, halogen atom such as chlorine atom, bromine atom, nitro group, cyano group, mercapto group, lower alkyl carboxyl group, carboxyl group, or carbamoyl group.

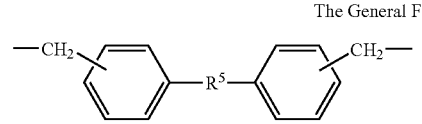

The General Formula (4)

In the General Formula (4), $R^5$ is oxygen atom, sulfur atom, methylene group, NH, SO, $C(CF_3)_2$, or $C(CH_3)_2$.

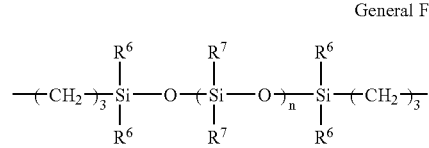

General Formula (5)

In General Formula (5), $R^6$ is alkyl group of number of carbons 1–4, such as methyl group, ethyl group, propyl group butyl group, or aryl group. Numeral n is an integer of 0–2000. $R^7$ is alkyl group of number of carbons 1–4, such as methyl group, ethyl group, propyl group, butyl group, or aryl group. As $R^7$, a group selected from the group shown by the following General Formula (6) can also be further listed.

General Formula (6)

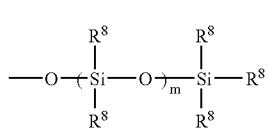

In the General Formula (6), $R^8$ is alkyl group of number of carbons 1–4 such as methyl group, ethyl group, propyl group, and butyl group, or aryl group. Numeral m is an integer of 0–100.

As a specific example of the preferable compound having 2 oxetane rings in the molecule, the following compounds are listed.

Specific Compound 1

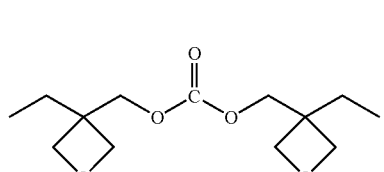

Specific Compound 2

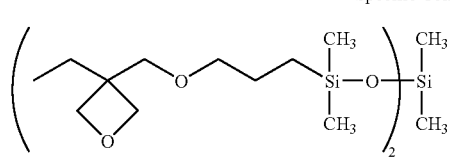

An illustrative compound 1 is, in the General Formula (2), a compound in which $R^1$ is ethyl group, and $R^3$ is carboxyl group. Further, the illustrative compound 2 is, in the General Formula (2), a compound in which $R^1$ is ethyl group, and $R^3$ is a compound in which $R^6$ and $R^7$ are, in the General Formula (5), methyl group, and numeral n is 1.

In the compound having 2 oxetane rings in the molecule, as the preferable example except the above-described compounds, there is a compound shown in the following General Formula (7). In the General Formula (7), $R^1$ is the same meaning as the $R^1$ in the General Formula (1).

General Formula (7)

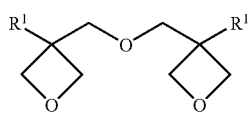

Further, as an example of the compound having 3–4 oxetane rings in the molecule, the compounds shown by the following General Formula (8) are listed.

General Formula (8)

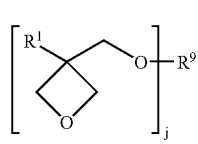

In the General Formula (8), $R^1$ is the same meaning as $R^1$ in the General Formula (1). As $R^9$, a branched chain alkylene group of number of carbons 1–12 such as groups shown by the following A–C, branched chain poly (alkylene oxy) group such as group shown by the following D, or branched chain poly siloxy group such as group shown by the following E, are listed. Numeral j is 3 or 4.

A

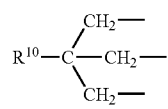

B

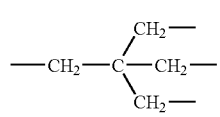

C

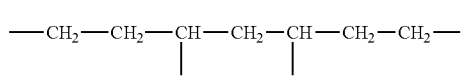

D

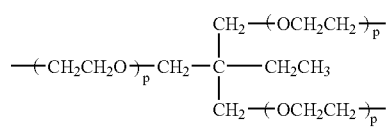

E

In above A, $R^{10}$ is the lower alkyl group such as methyl group, ethyl group, or propyl group. Further, in above D, p is an integer of 1–10.

As an example of compound having 3–4 oxetane rings in the molecule, the Specific Compound 3 is listed.

Specific Compound 3

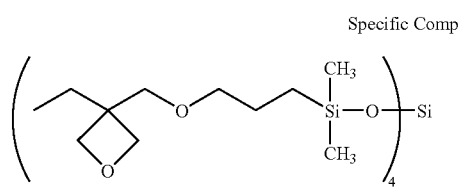

Further, as an example of compound having 1–4 oxetane rings except the above-described one, the compound shown by the following General Formula (9) is listed.

General Formula (9)

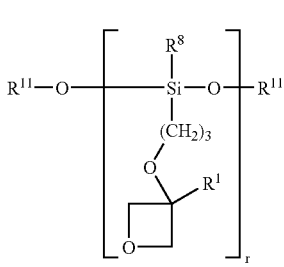

In the General Formula (9), $R^8$ is the same meaning as $R^8$ of the General Formula (6). $R^{11}$ is alkyl group of number of carbons 1–4 such as methyl group, ethyl group, propyl group or butyl group, or tri-alkyl silyl group, and r is 1–4.

As a preferable specific examples of the oxetane compounds used in the present example, there is a compound shown below.

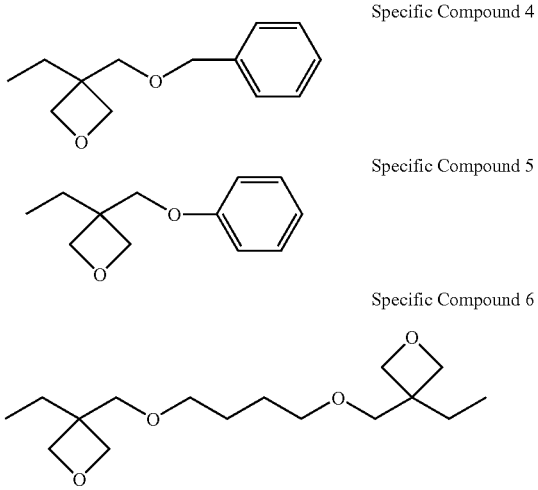

Specific Compound 4

Specific Compound 5

Specific Compound 6

The production method of the compound having the above-described oxetane ring is not particularly limited, and may follow the conventionally known method, for example, there is the oxetane ring synthesizing method from diol, which is disclosed by Pattison (D. B. Pattison, J.Am. Chem. Soc., 3455, 79 (1957)). Further, other than this, compounds having 1–4 oxetane rings having the high molecular weight of about 1000–5000 are also listed. As the specific examples of these compounds, the following compounds are listed.

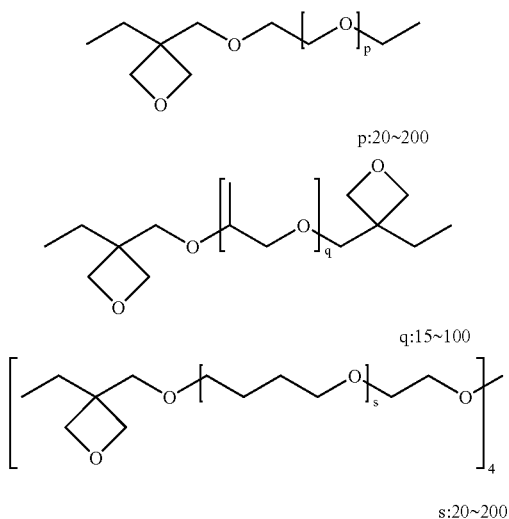

p:20~200 q:15~100 s:20~200

Next, an ink-jet recording apparatus (ink-jet printer), which can be used in the ink-jet recording method of the present invention, will be described.

As the method by which the active ray is irradiated and the ink is heated after the active ray-hardenable ink impacts on the recording material, a method as described, for example, in Japanese Unexamined Patent Application Publication No. 2002-137375 is proposed, however, as the result in which the present inventor conducts the supplementary study, it can be seen that the high stability of the ink-jetting which is one of objects of the present invention, can not be obtained, in the embodiment proposed in the patent description, just as it is, and as the result, it is found that to form the high quality image stably is impossible.

As the result of the eager study of the above-described problems, the present inventor finds that, in the ink-jet recording method for conducting the printing on the recording material by jetting the cation polymerization type active ray hardenable ink on the recording material by the ink-jet recording head, when the active ray hardenable ink includes the oxetane compound including an oxetane compound having one oxetane ring in the molecule and an oxetane compound having two or more of oxetane rings in the molecule, as the photo polymerizable compound, and the active ray is irradiated on the ink recorded on the recording material, and the recorded ink is heated, the object and effect of the present invention are attained.

In the present invention, it is one feature that the active ray is irradiated on the ink which impacts on the recording material, and the impacted ink is heated. As the jetting condition of the ink, it is preferable in the viewpoint of the jetting stability that the recording head and the ink are heated to 35–100° C., and the ink is jetted. Further, since the viscosity variation width of the active ray-hardenable ink due to the temperature variation is comparatively large, and the viscosity variation largely can influence the ink drop size and ink drop jetting speed and can cause the image quality deterioration, it is preferable that the temperature of the ink is maintained constant while the ink temperature is increased.

As the control width of the ink temperature, the temperature variation is preferably within ±5° C. from the set temperature, more preferably, within ±2° C., and still more preferably, within ±1° C.

In the present invention, it is preferable that the heating of the ink is conducted by a heating a heating plate which guides the conveyance of the recording material, and generates the heat. The heat is transmitted to the recording material by the heating plate, and by this heat, the recorded ink of the active ray-hardenable ink is heated.

Further, in the present invention, it is also preferable that the heating of the ink is conducted by a hot air blowing device which blows a hot air onto the active ray-hardenable ink recorded on the recording material.

Further, in the present invention, it is preferable that the active ray hardenable ink recorded on the recording material is heated to 40–80° C., and when the heating temperature is not higher than 40° C., the recorded ink may be not hardened depending on the environmental humidity, and there is the possibility that the image quality is deteriorated, and further, when the temperature is over 80° C., the film recording material may cause the shrinkage and wrinkle.

Further, the ink-jet recording apparatus, which can be used in the present invention, preferably has a humidity-detecting device for detecting the humidity of the printing environment. Further, it is preferable, in the viewpoint of the power saving, that when the humidity-detecting device detects the relative humidity not lower than 50%, the heating devices heats the recording material by the heating device.

Next, an example of the ink-jet recording apparatus of the present invention will be specifically described, however, the present invention is not limited to only these modes.

Figure 2:
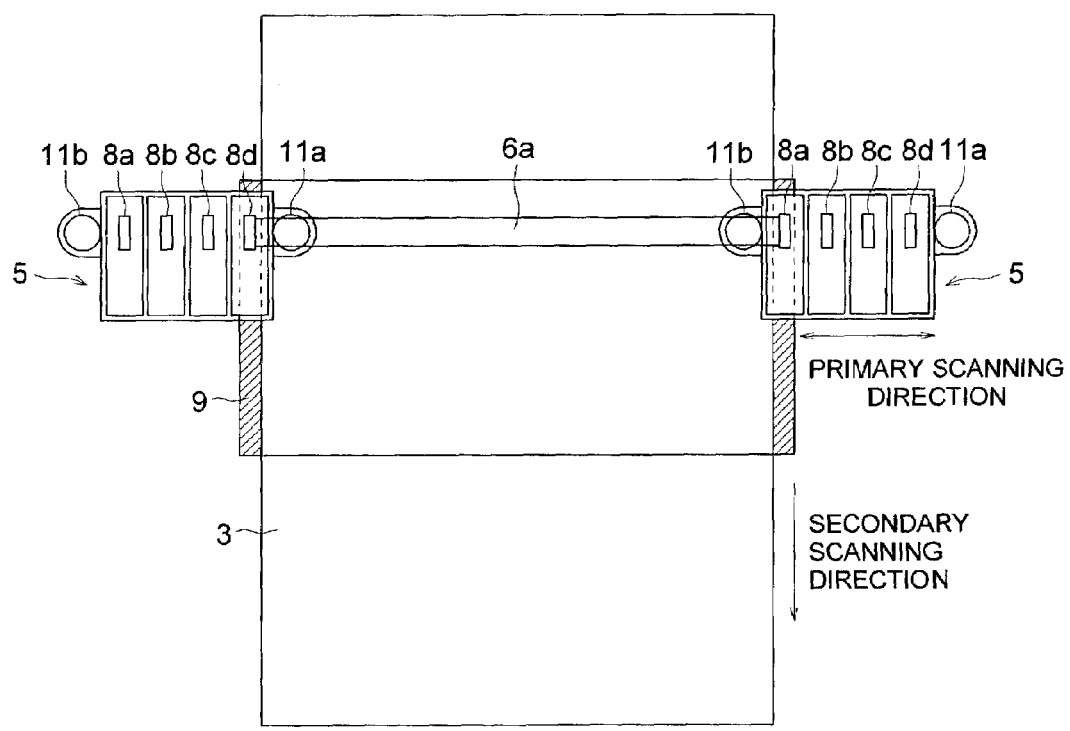
FIG. 2 is a schematic plan view showing the positional relationship of an ink-jet recording head, the leading edge of an optical fiber and a heating plate.
Figure 3:
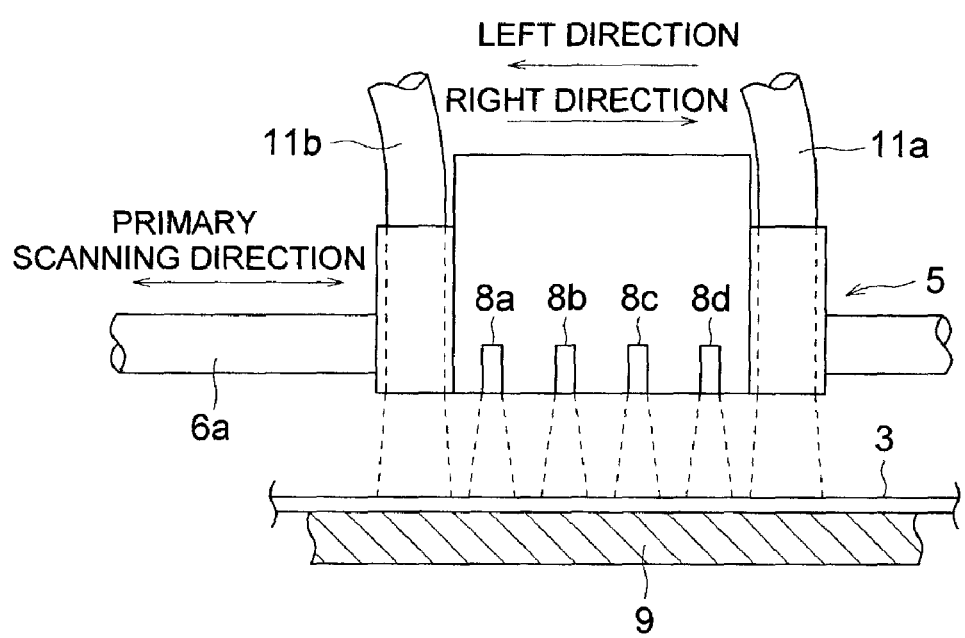
FIG. 3 is a schematic front view showing the positional relationship of the ink-jet recording head, the leading edge of the optical fiber and a heating plate and them.
Figure 4:
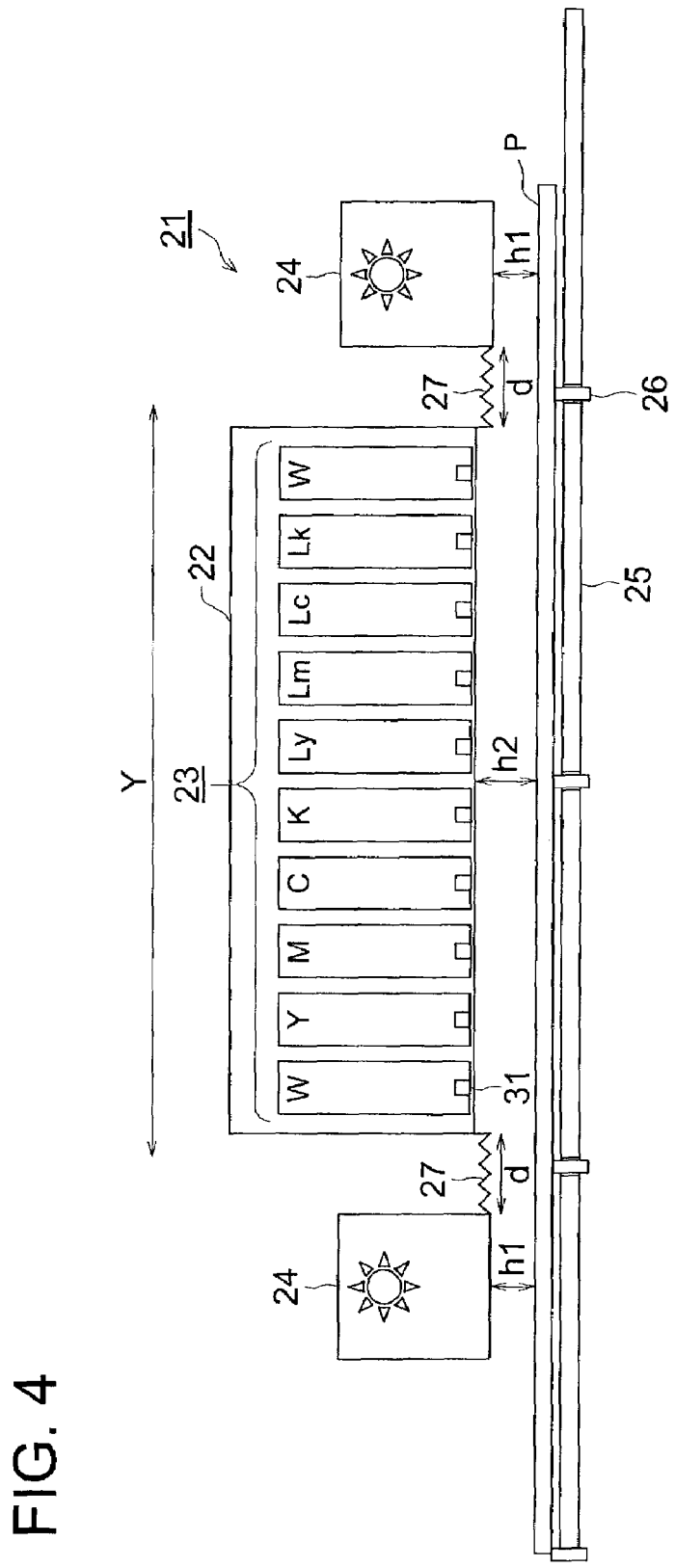
FIG. 4 is a schematic front view showing a part of another ink-jet printer, which can be used in the present invention.

FIGS. 1–4 show embodiments of the present invention, and FIG. 1 is a perspective view of the whole of an ink-jet printer having the heating device which can be used in the present invention. FIG. 2 is an schematic plan view showing the positional relationship of the ink-jet recording head, the leading edge of the optical fiber, and the heating plate. FIG. 3 is a schematic front view showing the positional relationship of the ink-jet recording head and the leading edge of the optical fiber and the heating plate. FIG. 4 is a schematic front view of a part of another ink-jet printer, which can be used in the present invention.

As shown in FIG. 1, an ink-jet printer 1 comprises a sheet feeding section 4, which is arranged at the upper position of the printer main body 2 and set the recording material 3 therein, a sheet conveying section, not illustrated, which conveys the recording material 3 set in this sheet feeding section 4 at a predetermined speed to the sub-scanning direction (the same direction as the sheet conveying direction) of the ink-jet recording head 5, an ink-jet recording head 5, which conducts the printing on the recording material 3 conveyed by this sheet conveying section, an active ray irradiating device A for irradiating the active ray on the impact position of the active ray hardenable ink jetted by the ink-jet recording head 5, a heating plate 9 as the heating device for heating the recorded active ray-hardenable ink, and a sheet ejecting section 7 for ejecting the recording material 3 printed by the ink-jet recording head 5.

The ink-jet recording head 5 is a serial type on demand type, and is provided movably in the main scanning direction (perpendicular direction in the sheet conveying direction) between the right position in FIG. 2 and the left position in FIG. 2 along a guide rod 6a of a head moving section 6. The movement range of the left side optical fiber 11b in the right position of FIG. 2, and the right side optical fiber 11a in the left position of FIG. 2, is set in such a manner that they respectively position at least at the outside of the printing area end of the recording material 3. The ink-jet recording head 5 has 4 nozzle head sections 8a–8d of the ink-jet type, and these 4 nozzle head sections 8a–8d are provided so that they can respectively jet the active ray-hardenable ink of each color of yellow, magenta, cyan, and black onto the recording material 3. The jetting timing of each of nozzle head sections 8a–8d is controlled according to the jetting data.

In FIG. 1, the active ray irradiation apparatus A houses the ultraviolet ray lamp, not illustrated, and has the ultraviolet ray generating section 10 for generating the ultraviolet ray, and 2 systems of optical fibers 11a and 11b which guide the ultraviolet ray generated from the ultraviolet ray generating section 10, and the leading edge of these 2 systems of the optical fibers 11a and 11b is fixed at both side positions in the main scanning direction of the ink-jet recording head 5. The optical fibers 11a and 11b are soft and have the flexibility, and when the flex situation is adjusted corresponding to the movement of the ink-jet recording head 5, the leading edge of the optical fibers 11a and 11b is moved in the main scanning direction together with the ink-jet recording head 5.

The relationship between the impact position of the active ray hardenable ink jetted from the ink-jet recording head 5 onto the recording material 3 and the irradiation position of the ultraviolet ray of the optical fibers 11a and 11b will be described. As shown in FIG. 3, the system is provided in such a manner that, when the ink-jet recording head 5 moves from the right to the left direction, the right side optical fiber 11a scans the impact position just after the impact, and when the ink-jet recording head 5 moves from the left to the right direction, the left side optical fiber 11b scans the impact position just after the impact. That is, the system is arranged so that respective 2 system optical fibers 11a and 11b are in charge of the irradiation in each of scanning directions of the ink-jet recording head 5.

The heating plate 9 is structured as a part of the guide plate which conveyance-guides the recording material 3 of the sheet feeding section 4 to the sheet ejecting section 7 through the printing portion, and is arranged over a range from the jetting point of the ink-jet recording head 5 to the conveyance downstream. The heating plate 9 has the heating element in the inside, and directly conducts the heat to the closely contacting recording material 3, and heats the recorded active ray hardenable ink.

In the above structure, when active ray hardenable ink is jetted onto the recording material 3 from the ink-jet recording head 5, the ultraviolet ray is irradiated to the active ray hardenable ink just after its impact (within 10 sec). Further, the recorded active ray hardenable ink is heated by the heat of the heating plate 9. From the above description, because the recorded active ray hardenable ink is subjected to the ultraviolet ray at the temperature not lower than a predetermined temperature, the hardening reaction is activated, thereby, the active ray hardenable ink is successively hardened even under the high humidity environment. Accordingly, even under the high humidity environment, the good printing can be conducted by using the active ray hardenable ink. Further, even when the recording material 3 in which the ink is easily bled is used, the ink bleeding is not generated, and the printed matter resistant to the rubbing, is obtained.

In this embodiment, the active ray irradiation device A has the ultraviolet ray generating section 10 for generating the ultraviolet ray and the optical fibers 11a and 11b for guiding the ultraviolet ray generated by the ultraviolet ray generating section 10 to the near position of the ink-jet type head 5, and because it irradiates the ultraviolet ray from the leading edge of these optical fibers 11a and 11b, and spottily irradiates the ultraviolet ray onto the ink impact position at the near distance to the recording material 3, by the weak ultraviolet ray, a predetermined ultraviolet ray amount can be sufficiently irradiated. Therefore, it is enough that the active ray irradiation apparatus A is a small sized and low cost apparatus. Further, because it is not necessary that the ultraviolet ray lamp corresponding to the printing width is prepared, and further, the ultraviolet ray lamp itself is moved, it is excellent also in the point of the safety and durability.

In this embodiment, because the leading edge of the optical fibers 11a and 11b is fixed to the ink-jet recording head 5, it is interlocked with the printing speed of the ink-jet recording head 5, and can move in the main scanning direction so that the it irradiates the impact position just after the impact of the active ray hardenable ink. Accordingly, because it is not necessary that the ultraviolet ray generating section 10 is moved, and it may be allowable when only the leading edge of the optical fibers 11a and 11b is moved, the following irradiation of the ultraviolet ray can be easily conducted. Further, because it is not necessary that a fiber moving section is particularly provided in order to move the leading edge of the optical fibers 11a and 11b, it contributes to the increase prevention of the number of parts, or the easiness of the control.

In this embodiment, because 2 systems of the optical fibers 11a and 11b are provided, each of leading edges of these 2 systems of optical fibers 11a and 11b is arranged at both side positions in the main scanning direction of the ink-jet recording head 5, and respective of the 2 systems of optical fibers 11a and 11b, are in charge of the irradiation in each scanning direction of the ink-jet recording head 5, even when in any direction the ink-jet recording head 5 scans, the ultraviolet ray can be effectively irradiated just after the ink impact. Accordingly, the active ray hardenable ink can be hardened without the irradiation position of the ultraviolet ray irradiated from the leading edge of the optical fibers 11a and 11b from being changed.

As a modified example of this embodiment, only one system of the optical fiber may be provided. However, when it is made correspond to the ink-jet recording head 5 which conducts the printing operation in both directions of the main scanning direction, also when the ink-jet recording head 5 scans in any direction, so that the ultraviolet ray can be effectively irradiated, it is necessary that the irradiation position of the ultraviolet ray which is irradiated from the leading edge of the optical fiber is changed. Hereupon, in the case of the ink-jet recording head 5 which conducts the printing operation only in one direction of the main scanning direction, it is of course not necessary that the irradiation position of the ultraviolet ray which is irradiated from the leading edge of the optical fiber is changed.

Further, the ink-jet recording head may also be made a line type on-demand type, and in this case, a moving section for moving the optical fiber in the main scanning direction is necessary.

Further, in this embodiment, the heating device is structured by the heating plate 9, however, it may also be structured as the hot air blowing device for blowing the hot air onto the active ray hardenable ink recorded on the recording material 3. When structured in this manner, onto the recorded active ray hardenable ink, the hot air is blown by the hot air blowing device, and the active ray hardenable ink is heated. Herein, when the hot air blowing device is structured in such a manner that the heat generated from the ultraviolet ray generating section 10 is guided to the vicinity of the ink-jet recording head 5 by the tube, it is not necessary that the hot air generating section is separately provided, and because it contributes to the reduction of the number of parts and the cost reduction, it is preferable.

In this connection, in the above description, the ink-jet recording head 5 is a head for color printing having a plurality of nozzle head portions 8a–8d, however, the monochromatic head having a single nozzle head can also be used.

FIG. 4 is a schematic front view showing a part of the structure of another recording apparatus, which can be used in the present invention. A recording apparatus 21 is structured by providing with a head carriage 22, a recording head 23, an irradiation section 24, and a platen section 25. In this recording apparatus 21, the platen section 25 is arranged under the recording material P. The platen section 25 has a function to absorb the ultraviolet ray, and absorbs the surplus ultraviolet ray passed the recording material P. As the result, the high minute image can be reproduced very stably.

The recording material P is guided by a guide member 26, and by the activation of a conveying section (not shown), moves from near side in FIG. 4, to the far side. A head scanning section (not shown) conducts the scanning of the recording head 23 held on the head carriage 22 by reciprocating the head carriage 22 to the Y direction in FIG. 4.

The head carriage 22 is arranged on the upper side of the recording material, and a plurality of the recording heads 23 which will be described later, corresponding to the number of colors use for the image printing on the recording material P are arranged in such a manner that their jetting exits are on the lower side, and housed. The head carriage 22 is arranged in the reciprocation-free mode in the Y direction in FIG. 4 to the recording apparatus 21 main body, and by the drive of the head scanning section, reciprocates in the Y direction in FIG. 4.

In this connection, in FIG. 4, the head carriage 22 is shown as it houses the recording head 23 of white (W), yellow(Y), magenta (M), cyan (C), black (K), light yellow (Ly), light magenta (Lm), light cyan (Lc), and light black (Lk). However, in the actual operation, the number of colors of the recording head 23 housed in the head carriage 22 can be appropriately determined.

The recording head 23 jets the active ray hardenable ink (for example, UV hardenable ink) onto the recording material P from the jetting exit by the operation of the jetting section (not illustrated) a plurality of which are provided in the inside. The UV hardenable ink jetted from the recording head 23 is composed including the coloring material, polymerization monomer, and initiator (photo acid generating agent), and when the ultraviolet ray is irradiated on it, it has the characteristic in which it is hardened by the bridging of monomer, and polymerization reaction caused by the action in which the initiator acts as the catalysis.

The recording head 23 jets the UV hardenable ink onto a predetermined area in the recording material P (impact-able area) as the ink drop, during the scanning by which, by the drive of the head scanning section, it moves from one end of the recording material P to another end of the recording material P in Y direction in FIG. 4, and impacts the ink drop in the impact-able area.

The above-described scanning is conducted appropriate number of times, and after the jetting of the UV hardenable ink is conducted onto the impact-able range of one range, by the conveying section, the recording material P is appropriately moved from this side to the other side, and while the scanning by the head scanning section is conducted again, by the recording head 23, to the above-described impact-able area, the UV hardenable ink is jetted onto the next impact-able area adjoining to the depth direction in FIG. 4.

When the above-described operation is repeated and the UV ink is jetted from the recording head 23 by interlocking with the head scanning section and conveying section, the image composed of the aggregation of the UV hardenable ink drops is formed on the recording material P.

The irradiation section 24 is structured by providing with the ultraviolet ray lamp by which the ultraviolet ray in the specific wavelength region is emitted by the stable exposure energy, and the filter which transmits the ultraviolet ray in the specific wavelength region. Herein, as the ultraviolet ray lamp, the mercury lamp, metal halide lamp, excimer laser, ultraviolet ray laser, cold cathode tube, black light and LED are applicable, and the belt-like metal halide lamp tube, cold cathode tube, mercury lamp tube, or black light is preferable. Particularly, the cold cathode tube and black light which emit the ultraviolet ray of wavelength 365 nm, can effectively conduct the bleed prevention and dot diameter control, and can also reduce the wrinkle at the time of hardening, and preferable. When the black light is used for the irradiation light source of the irradiation section 24, the irradiation section 24 for hardening the UV hardenable ink can be produced at the low cost.

The irradiation section 24 has almost the same shape as the maximum one which can be set in the recording apparatus (for example, UV inkjet printer) or the shape larger than the impact-able area, in the impact-able areas onto which the recording head 23 jets the UV ink by the one-time scanning by the drive of the head scanning section.

The irradiation section 24 is fixed in almost parallel to the recording material P on both sides of the head carriage 22, and arranged.

As described above, as a device for adjusting the irradiation of the ink jetting section, it is of cause that the whole of the recording head is light-shielded, and in addition to that, it is effective that the distance h2 between the ink jetting portion 31 of the recording head 3 and the recording material P is made larger than the distance hi between the irradiation section 4 and the recording material P (h1<h2), or the recording head 23 is separated from the irradiation section 24 (the distance d between the recording head 23 and the irradiation section 24 is made large). Furthermore, when a bellows structure 27 is provided between the recording head 23 and the irradiation section 24, it is further preferable.

Herein, the wavelength of the ultraviolet ray irradiated by the irradiation section 24 can be appropriately changed by replacing the ultraviolet ray lamp or filter provided in the irradiation section 24.

In the present invention, it is preferable that the total thickness of jetted ink after the ink is jetted on the recording material and the active ray is irradiated and the ink is hardened, is 2–20 μm. In the ink-jet method utilizing the active ray hardenable ink in a screen printing field, the actual situation is that the total thickness of the jetted ink is around 20 μm, however, in the soft package printing field in which, in many cases, the recording material is a thin plastic material, it is not preferable because there can be a problem that the strength and texture of the whole printed matters are changed, not only the problem of the curl and wrinkle of the recording material.

In the present invention, the "total thickness of jetted ink" means the maximum value of the film thickness of the ink which is drawn on the recording material, and even when the recording is conducted by the inkjet recording system of mono color, or 2-color superposition (secondary color)other than that , 3-color superposition, or 4-color superposition (white ink base), the total thickness of jetted ink means the same.

Further, in the present invention, it is preferable that the amount of each ink drop from each nozzle is 2–15 pl. In order to form the high minute image, it is necessary that the ink drop amount be in this range, however, when the ink is jetted in this range, the jetting stability particularly becomes severe. By the present invention, when the ink-jet recording is conducted with using such small ink drops, the jetting stability can be increased and the high minute image can be obtained.

In the ink-jet recording method of the present invention, as the irradiation condition of the active ray, it is preferable that the active ray is irradiated between 0.001–2.0 sec after the ink reaches the recording material, more preferably, between 0.001–1.0 sec. In order to form the high minute image, it is particularly important that the irradiation timing is as fast as possible.

As the irradiation method of the active ray, other than the above description, its basic method is disclosed in Japanese Unexamined Patent Application Publication No. 60-132767. According to this, the light sources are provided on both sides of the head unit, the head and the light source are scanned by the shuttle system. The irradiation is conducted after the ink impacts, after a predetermined time. Further, the hardening is completed by another light source not accompanied by the drive. In the U.S. Pat. No. 6,145,979, as the irradiation method, the method using the optical fiber, or the method which irradiates the UV ray onto the recording section after the collimated light source is hit to the mirror surface provided on the head unit side surface is disclosed. In the image forming method of the present invention, any irradiation method of them can also be used.

Further, the irradiation of the active ray is divided into 2 stages, and initially, the active ray is irradiated by the above-described method for the time period of 0.001–2.0 sec after the ink reaches the recording material, and after the whole printing is completed, the method by which further the active ray is irradiated, is also one of preferable methods. When the irradiation of the active ray is divided into 2 stages, the shrinkage of the recording material which occurs at the time of ink hardening can be suppressed.

In the present invention, it is preferable that the active ray of low illumination in which the maximum illumination in the wavelength area effective for the ink hardening, is not smaller than 0.1 and less than 50 mW/cm$^2$, is used.

Conventionally, in the UV inkjet system, for the suppression of the dot spread and bleeding after the ink impact, it is ordinary that the light source of the high illumination in which the maximum illumination of the active ray in the wavelength area effective for the hardening is over the 50 mW/cm$^2$, is used. However, when such a light source is used, particularly in the shrink label, it is present situation that the shrinkage of the recording material is too large, and it is difficult to be actually used.

Relating to the kind of the light source to irradiate, the ultraviolet ray such as UV-A, UV-B, UV-C, vacuum ultraviolet ray, other than visible ray, γ ray or β ray can be used. In the present invention, it is preferable that the total power consumption of the light source is not larger than 1 kWh.

Further, in the present invention, it is preferable that the total power consumption of the irradiation light source of the active ray is not larger than 1 kWh. Conventionally, in the UV ink-jet system, for the suppression of the dot spread and the bleeding after the ink impacts, ordinarily, the high illumination light source whose total power consumption exceeds 1 kWh is used. However, when these light sources are used, particularly in the shrink label, because the shrinkage of the recording material is too much large, it is an actual situation that, practically, they can not be used. As an example of the light source whose total power consumption regulated in the present invention is not larger than 1 kWh, for example, the fluorescent lamp, cold cathode tube, or LED can be listed, but it is not limited to them.

Next, the cation polymerization type active ray hardenable ink used in the present invention will be further detailed.

As the photo initiator, which can be used in the present invention, all photo acid generating agents which are publicly known, can be listed.

As the photo acid generating agents, the compounds used for the chemical amplification type photo resist or photo cation polymerization is used (Organic electronics material study group edition, "Organic material for imaging" bunshin publication co., (1993), refer to page 187–192). Examples of the compounds preferable for the present invention will be listed below.

Initially, the salt such as B $(C_6F_5)_4^-$, $PF_6^-$, $AsF_6^-$, $SbF_6^-$, $CF_3SO_3^-$ of the aromatic onium compound such as diazonium, ammonium, iodonium, sulfonium, phosphonium, can be listed.

Specific example of onium compound, which can be used in this present invention, will be shown blow.

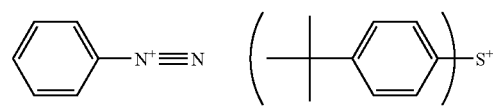

-continued
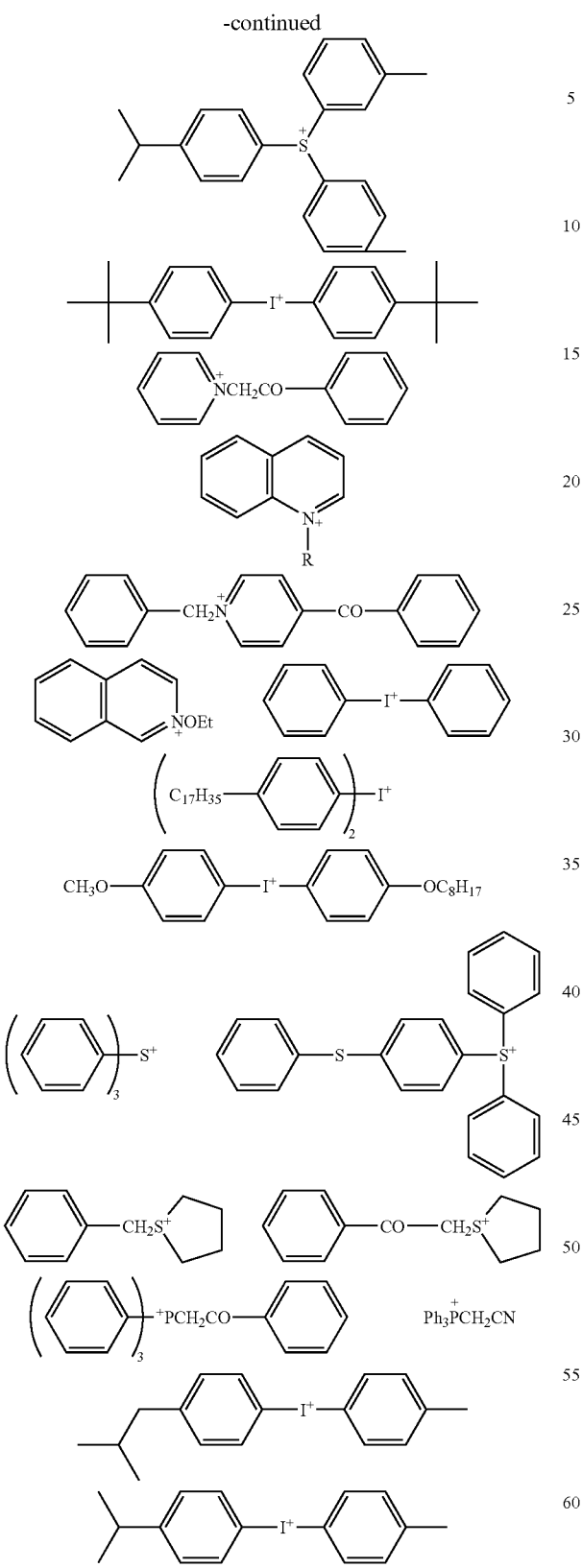
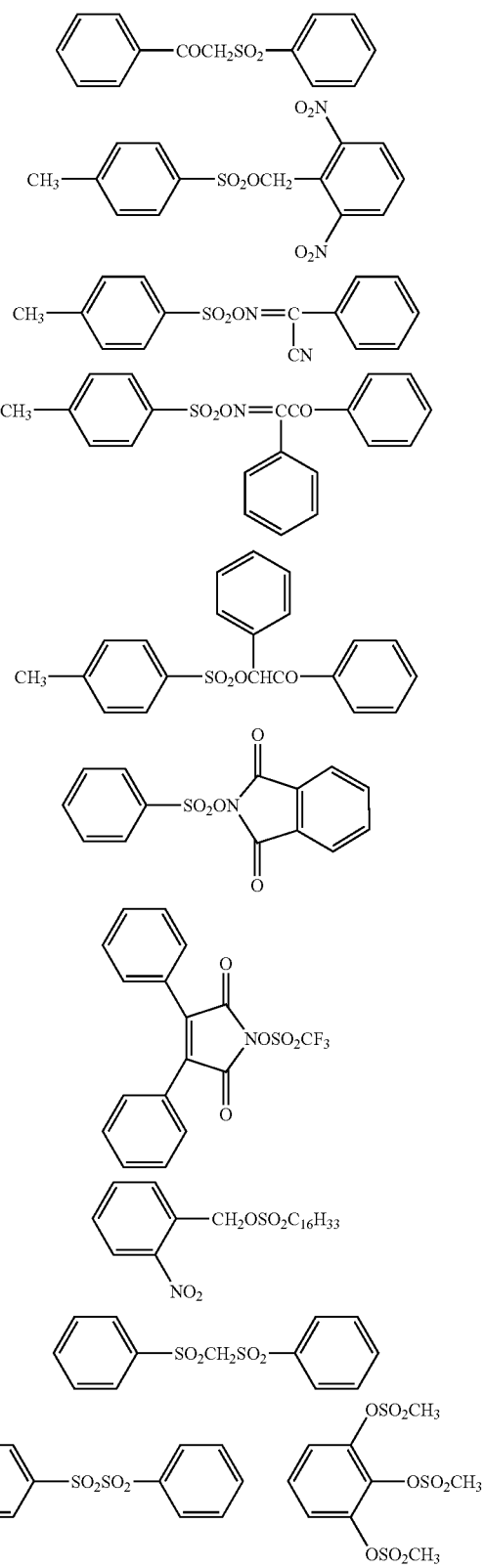
Secondly, the sulfonic compound generating the sulfonic acid can be listed. Its specific compound will be illustrated below.
Thirdly, the halide compound generating the hydrogen halide can also be used. Its specific compound will be illustrated below.

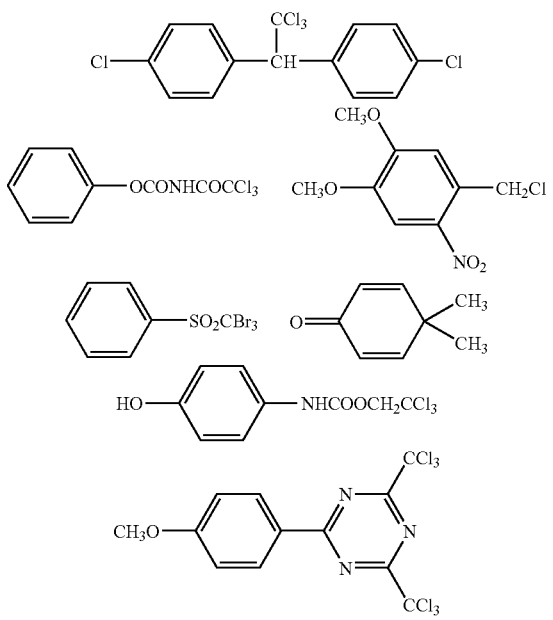

Fourthly, iron allene complex can be listed.

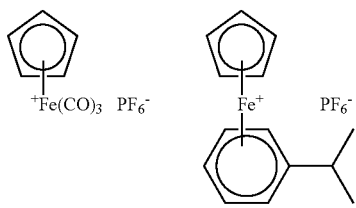

The ink, which can be used in the present invention, is preferable that it includes an acid breeding agent which newly generates the acid by the acid generated by the irradiation of the active ray which is publicly known already including Japanese Unexamined Patent Application Publication No. 8-248561, 9-034106. When the acid breeding agent is used, the jetting stability can be further increased.

In the ink according to the present invention, it is preferable that at least 1 kind of photo acid generating agent selected from the aromatic onium compound such as diasonium having aryl borate compound as the anti-ion, iodonium, or sulfonium, and the iron allen complex is included.

Particularly, in the soft package printing, or label printing field, from the viewpoint of a problem of the wrinkle of the above-described recording material and a problem of the jetting stability, the ink-jet recording of the active ray hardenable ink is not yet put into a practical use, however, the present invention provides the image forming method which can be sufficiently used also in these fields.

Next, the photo polymerizable compound, which can be used in the present invention, will be described. As the light-cation polymerization monomer, each kind of publicly known cation polymerization monomer can be used, together with the oxetane compounds described above. For example, the epoxy compound, or vinyl ether compound illustrated in Japanese Unexamined Patent Application Publication Nos. 6-9714, 2001-31892, 2001-40068, 2001-55507, 2001-310938, 2001-310937, and 2001-220526 is listed.

As the aromatic epoxide, the preferable one is a di or poly-glycidyl ether produced by the reaction of polyatomic phenol having at least one aromatic nucleus or its alkylene oxide additive body with epichlorohydrin, and for example, a di or poly-glycidyl ether of bisphenol A or its alkylene oxide additive body, di or poly-glycidyl ether of hydrogen additive bisphenol A or its alkylene oxide additive body, and novolak type epoxy resin are listed. Herein, as the alkylene oxide, the ethylene oxide and propylene oxide are listed.

As the alicyclic epoxide, the cyclohexene oxide or cyclopentene oxide-contained compound obtained when the compound having at least one cycloalkan ring such as cyclohexene or cyclopentene ring is subjected to epoxidation by the appropriate oxidation agent such as hydrogen peroxide, peroxy acid, is preferable.

As a preferable example of the alicyclic epoxide, there is an aliphatic polyatomic alcohol or di or poly-glycidyl ether of its alkylene oxide additive body, and as the representative example, di-glycidyl ether of the ethylene glycol, di-glycidyl ether of alkylene glycol such as di-glycidyl ether of propylene glycol or di-glycidyl ether of 1, 6 hexane diol, polyglycidyl ether of polyatomic alcohol such as di or tri-glycidyl ether of glycerin or its alkylene oxide additive body, di-glycidyl ether of poly alkylene glycol such as di-glycidyl ether of polypropylene glycol or its alkylene oxide additive body, are listed. Herein, as the alkylene oxide, the ethylene oxide and propylene oxide are listed.

In these epoxide, when the quick hardening property is considered, the aromatic epoxide and alicyclic epoxide are preferable, and particularly, the alicyclic epoxide is preferable. In the present invention, one kind of above-described epoxide may be singly used, however, 2 or more kinds of them may also be appropriately combined and used.

As the vinyl ether compound, for example, di or tri-vinyl ether compound such as ethylene glycol di-vinyl ether, di-ethylene glycol di-vinyl ether, tri-ethylene glycol di-vinyl ether, propylene glycol di-vinyl ether, di-propylene glycol di-vinyl ether, butane diol di-vinyl ether, hexane diol di-vinyl ether, cyclohexane di-methanol di-vinyl ether, tri-methylol propane tri-vinyl ether, and mono-vinyl ether compound such as ethyl vinyl ether, n-butyl vinyl ether, iso-butyl vinyl ether, octa-decil vinyl ether, cyclohexyl vinyl ether, hydroxyl butyl vinyl ether, 2-ethyl hexyl vinyl ether, cyclohexane di-methanol mono-vinyl ether, n-propyl vinyl ether, iso-propyl vinyl ether, iso-propenyl ether-O-propylene carbonate, dodecyl vinyl ether, di-ethylene glycol mono vinyl ether, octa-decyl vinyl ether, are listed.

In these vinyl ether compounds, when the hardenability, adhesiveness, and surface hardness are considered, di or tri-vinyl ether compound is preferable, and particularly, di-vinyl ether compound is preferable. In the present invention, one kind of the above-described vinyl ether compounds may be singly used, but, 2 kinds or more of them may also be appropriately combined and used.

When the ink used in the present invention is colored, the coloring material is added. As the coloring material, each kind of coloring material which can be dissolved or dispersed in main component of polymerization compound, can be used, however, from the view point of the weather-tightness, a pigment is preferable.

The pigments, which can be preferably used, will be listed below.

C. I Pigment Yellow-1, 3, 12, 13, 14, 17, 81, 83, 87, 95, 109, 42
C. I Pigment Orange-16, 36, 38,
C. I Pigment Red-5, 22, 38, 48:1, 48:2, 48:4, 49:1, 53:1, 57:1, 63:1, 144, 146, 185, 101,
C. I Pigment Violet-19, 23,
C. I Pigment Blue-15:1, 15:3, 15:4, 18, 60, 27, 29,
C. I Pigment Green-7, 36,
C. I pigment White-6, 18, 21,
C. I Pigment Black-7

Further, in the present invention, in order to increase the shielding property of the color in the transparent substrate such as the plastic film, it is preferable that the white ink is used. Particularly, in the soft package printing and label printing, it is preferable that the white ink is used, however, because the jet amount of the ink becomes large, from the viewpoint of the above-described jetting stability, generation of the curl or wrinkle of the recording material, naturally, there is a limitation relating to the using amount.

For the dispersion of the pigment, for example, a ball mill, sand mill, atritor, roll mill, agitator, Henschel mixer, colloid mill, ultrasonic homogenizer, pearl mill, wet jet mill, or paint shaker can be used. Further, when the pigment is dispersed, a dispersing agent can also be added. As the dispersing agent, it is preferable that the polymeric dispersing agent is used, and as the polymeric dispersing agent, Solsperse series of Avecia Co., are listed. Further, as the dispersion auxiliary, a synergist corresponding to each kind of pigment can also be used. In these dispersing agent and dispersion auxiliary, it is preferable that, to the pigment 100 mass part, 1–50 mass part is added. As dispersion medium, the dispersion is conducted by using the solvent or polymerization compound, however, it is preferable that the active ray hardenable ink used in the present invention has no solvent because it is reacted and hardened just after the ink impacts. When the solvent remains on the hardened image, a problem of the deterioration of the solvent resistance, and VOC (Volatile Organic Compound) of the remaining solvent is generated. Accordingly, it is preferable in the dispersion property that the dispersion medium is not the solvent, but the polymerization compounds, and in them, the monomer whose viscosity is lowest is selected.

In the dispersion of the pigment, it is preferable that the average particle diameter of pigment particles is 0.08–0.5 µm, and preferably, the pigment, dispersing agent, selection of the dispersion medium, dispersing condition, and filtering condition are set so that maximum particle diameter is within 0.3–10 µm, more preferably, 0.3–3 µm. By this particle diameter control, the choking of the head nozzle can be suppressed, and conservation stability of the ink, ink transparency and hardening sensitivity can be maintained.

As the coloring material density of the ink used in the present invention, it is preferable that it is 1–10 weight % of the whole ink.

In the ink used in the present invention, various additive agents can be used other than the above description. For example, in order to increase the conservation property of the ink component, the polymerization inhibitor can be added by 200–20000 ppm. Because, for the ultraviolet ray hardenable ink, it is preferable that the ink is heated and made low density and jetted, also in order to prevent the head choking by the thermal polymerization, it is preferable that the polymerization inhibitor is added. Other than that, the interface active agent, leveling additive agent, matting agent, polyester rein for adjusting the film physical properties, polyurethane resin, vinyl resin, acrylic resin, rubber resin, or wax can be added as necessary. In order to improve the adhesion to the recording medium, it is also effective that very small amount of organic solvent is added. In this case, the addition in the range in which the problem of the solvent resistance or VOC does not occur, is effective, and the using amount is in the range of 0.1–5 weight %, and preferably, 0.1–3 weight %. Further, the radical polymerization monomer and the initiator are combined, and can also be made the hybrid type hardened ink of the radical and cation.

Still further, it is preferable that the viscosity of the active ray hardenable ink used in the invention is 7 to 50 mPa·s under 25° C. The viscosity of the ink can be controlled by adjusting the components in the ink, appropriately.

As the recording material which can be used in the present invention, other than an ordinary non-coat sheet and coat sheet, each kind of non-absorptive plastic used for so-called soft package and its film can be used, and as each kind of plastic film, for example, PET (polyethylene terephthalate) film, OPS (drawing polystyrene) film, OPP (drawing polypropylene) film, ONy (drawing nylon) film, PVC (polyvinyl chloride) film, PE (polyethylene) film, or TAC film can be listed. As the other plastic, polycarbonate, acrylic resin, ABS, polyacetal, PVA, or rubber can be used. Further, it can also be applied to metal or glass. In these recording materials, particularly when the image is formed onto the PET film, OPS film, OPP film, ONy film, PVC film, which are shrinkable by the heat, the structure of the present invention is effective. In these base materials, not only the curl and deformation of the film are easily generated by the heat generation at the time of hardening shrinkage and hardening reaction of the ink, but the ink film also hardly follows the shrinkage of the base material.

The surface energy of each kind of plastic film is largely different and conventionally, it is a problem that the dot diameter after the ink impact is changed depending on the recording material. In the structure of the present invention, the good high minute image can be formed on the recording material of the wide range in which the surface energy is 35–60 dyn/cm including OPP film, OPS film, whose surface energy is low, and PET whose surface energy is comparatively large.

In the present invention, in the viewpoint of the cost of the recording material such as the cost of the package or the production cost, and the production efficiency of the print, and which can cope with the print of each kind of size, it is advantageous that the long sized (web) recording material is used.

EXAMPLES

Examples of the present invention will be shown and specifically described below, however, the embodiment of the present invention is not limited to these examples.

(Adjustment of the Ink Composition)

The ink composition set 1 (comparative example) composed of the composition described in Table 1 and the ink composition sets 2–6 (present invention) composed of the composition described in Table 2–6, are adjusted.

TABLE 1

Ink composition set 1 (comparative example)

Ink composition (mass %)

| Kind of inks | Coloring material Kind | Coloring material Additional amount | Photo polymerization compound Epoxy compound *A | Photo polymerization compound Oxetane compound (2 functions) OXT-121 | Acid breeding agent Acpres11 | Basic compound *1 | Thermal base generating agent Thermal base 1 | Photo oxide generating agent C1-5102 | Photo oxide generating agent auxiliary agent CS-7102 |
|---|---|---|---|---|---|---|---|---|---|
| K | C1 | 5.0 | 37.8 | 50.0 | 1.0 | 0.1 | 0.1 | 5.0 | 1.0 |
| C | C2 | 2.5 | 37.3 | 55.0 | 1.0 | 0.1 | 0.1 | 3.0 | 1.0 |
| M | C3 | 3.0 | 36.8 | 55.0 | 1.0 | 0.1 | 0.1 | 3.0 | 1.0 |
| Y | C4 | 2.5 | 37.3 | 55.0 | 1.0 | 0.1 | 0.1 | 3.0 | 1.0 |
| W | C5 | 5.0 | 39.8 | 55.0 | 1.0 | 0.1 | 0.1 | 3.0 | 1.0 |
| Lk | C1 | 0.6 | 39.2 | 55.0 | 1.0 | 0.1 | 0.1 | 3.0 | 1.0 |
| Lc | C2 | 0.8 | 39.1 | 55.0 | 1.0 | 0.1 | 0.1 | 3.0 | 1.0 |
| Lm | C3 | 0.6 | 39.2 | 55.0 | 1.0 | 0.1 | 0.1 | 3.0 | 1.0 |
| Ly | C4 | 0.2 | 39.6 | 55.0 | 1.0 | 0.1 | 0.1 | 3.0 | 1.0 |

C1–C5: Coloring material 1–coloring material 5

TABLE 2

Ink composition set 2 (comparative example)

Ink composition (mass %)

| Kind of inks | Coloring material Kind | Coloring material Additional amount | Photo polymerization compound Epoxy compound *A | Photo polymerization compound Oxetane compound (2 functions) OXT-221 | Photo polymerization compound Oxetane compound (Mono function) OXT-212 | Acid breeding agent Acpres11 | Basic compound *1 | Thermal base generating agent Thermal base 1 | Photo oxide generating agent C1-5102 | Photo oxide generating agent auxiliary agent CS-7102 |
|---|---|---|---|---|---|---|---|---|---|---|
| K | C1 | 5.0 | 17.8 | 40.0 | 30.0 | 1.0 | 0.1 | 0.1 | 5.0 | 1.0 |
| C | C2 | 2.5 | 27.3 | 35.0 | 30.0 | 1.0 | 0.1 | 0.1 | 3.0 | 1.0 |
| M | C3 | 3.0 | 26.8 | 35.0 | 30.0 | 1.0 | 0.1 | 0.1 | 3.0 | 1.0 |
| Y | C4 | 2.5 | 27.3 | 35.0 | 30.0 | 1.0 | 0.1 | 0.1 | 3.0 | 1.0 |
| W | C5 | 5.0 | 19.8 | 40.0 | 30.0 | 1.0 | 0.1 | 0.1 | 3.0 | 1.0 |
| Lk | C1 | 0.6 | 29.2 | 35.0 | 30.0 | 1.0 | 0.1 | 0.1 | 3.0 | 1.0 |
| Lc | C2 | 0.8 | 29.1 | 35.0 | 30.0 | 1.0 | 0.1 | 0.1 | 3.0 | 1.0 |
| Lm | C3 | 0.6 | 29.2 | 35.0 | 30.0 | 1.0 | 0.1 | 0.1 | 3.0 | 1.0 |
| Ly | C4 | 0.2 | 24.6 | 40.0 | 30.0 | 1.0 | 0.1 | 0.1 | 3.0 | 1.0 |

C1–C5: Coloring material 1–coloring material 5

TABLE 3

Ink composition set 3 (comparative example)

Ink composition (mass %)

| Kind of inks | Coloring material Kind | Coloring material Additional amount | Photo polymerization compound Epoxy compound *B | Photo polymerization compound Oxetane compound (2 functions) OXT-221 | Photo polymerization compound Oxetane compound (Mono function) OXT-212 | Acid breeding agent Acpres11 | Basic compound *2 | Thermal base generating agent Thermal base 1 | Photo oxide generating agent C1-5102 | Photo oxide generating agent auxiliary agent CS-7102 |
|---|---|---|---|---|---|---|---|---|---|---|
| K | C1 | 5.0 | 17.8 | 38.1 | 30.0 | 1.0 | 0.01 | 0.1 | 5.0 | 1.0 |
| C | C2 | 2.5 | 27.3 | 33.1 | 30.0 | 1.0 | 0.01 | 0.1 | 3.0 | 1.0 |
| M | C3 | 3.0 | 26.8 | 33.1 | 30.0 | 1.0 | 0.01 | 0.1 | 3.0 | 1.0 |
| Y | C4 | 2.5 | 27.3 | 33.1 | 30.0 | 1.0 | 0.01 | 0.1 | 3.0 | 1.0 |
| W | C5 | 5.0 | 19.8 | 38.1 | 30.0 | 1.0 | 0.01 | 0.1 | 3.0 | 1.0 |
| Lk | C1 | 1.3 | 29.2 | 32.5 | 30.0 | 1.0 | 0.01 | 0.1 | 3.0 | 1.0 |

TABLE 3-continued

Ink composition set 3 (comparative example)

Ink composition (mass %)

| Kind of inks | Coloring material Kind | Coloring material Additional amount | Photo polymerization compound Epoxy compound *B | Photo polymerization compound Oxetane compound (2 functions) OXT-221 | Photo polymerization compound Oxetane compound (Mono function) OXT-212 | Acid breeding agent Acpres11 | Basic compound *2 | Thermal base generating Thermal base 1 | Photo oxide generating agent C1-5102 | Photo oxide generating agent auxiliary agent CS-7102 |
|---|---|---|---|---|---|---|---|---|---|---|
| Lc | C2 | 0.6 | 29.1 | 33.2 | 30.0 | 1.0 | 0.01 | 0.1 | 3.0 | 1.0 |
| Lm | C3 | 0.8 | 29.2 | 33.0 | 30.0 | 1.0 | 0.01 | 0.1 | 3.0 | 1.0 |
| Ly | C4 | 0.6 | 29.6 | 32.6 | 30.0 | 1.0 | 0.01 | 0.1 | 3.0 | 1.0 |

C1–C5: Coloring material 1–coloring material 5

TABLE 4

Ink composition set 4 (comparative example)

Ink composition (mass %)

| Kind of inks | Coloring material Kind | Coloring material Additional amount | Photo polymerization compound Epoxy compound *C | Photo polymerization compound Oxetane compound (2 functions) OXT-121 | Photo polymerization compound Oxetane compound (Mono function) OXT-211 | Acid breeding agent Acpres 11 | Basic compound *1 | Thermal base generating agent Thermal base 2 | Light thermal oxide generating agent Initiator 1 | Photo oxide generating agent CG-1552 | Photo oxide generating agent auxiliary agent *3 |
|---|---|---|---|---|---|---|---|---|---|---|---|
| K  | C1 | 5.0 | 15.0 | 17.8 | 51.6 | 3.0 | 0.01 | 0.1 | 1.5 | 5.0 | 1.0 |
| C  | C2 | 2.5 | 10.0 | 27.3 | 52.1 | 3.0 | 0.01 | 0.1 | 1.0 | 3.0 | 1.0 |
| M  | C3 | 3.0 | 10.0 | 26.8 | 52.1 | 3.0 | 0.01 | 0.1 | 1.0 | 3.0 | 1.0 |
| Y  | C4 | 2.5 | 10.0 | 27.3 | 52.1 | 3.0 | 0.01 | 0.1 | 1.0 | 3.0 | 1.5 |
| W  | C5 | 5.0 | 15.0 | 19.8 | 51.6 | 3.0 | 0.01 | 0.1 | 1.5 | 3.0 | 1.0 |
| Lk | C1 | 1.3 | 10.0 | 29.2 | 51.5 | 3.0 | 0.01 | 0.1 | 1.0 | 3.0 | 1.0 |
| Lc | C2 | 0.6 | 10.0 | 29.1 | 52.2 | 3.0 | 0.01 | 0.1 | 1.0 | 3.0 | 1.0 |
| Lm | C3 | 0.8 | 10.0 | 29.2 | 52.0 | 3.0 | 0.01 | 0.1 | 1.0 | 3.0 | 1.0 |
| Ly | C4 | 0.6 | 10.0 | 29.6 | 51.6 | 3.0 | 0.01 | 0.1 | 1.0 | 3.0 | 1.0 |

C1–C5: Coloring material 1–coloring material 5

TABLE 5

Ink composition set 5 (comparative example)

Ink composition (mass %)

| Kind of inks | Coloring material Kind | Coloring material Additional amount | Photo polymerization compound Epoxidation poly-butan *D | Photo polymerization compound Oxetane compound (2 functions) OXT-221 | Photo polymerization compound Oxetane compound (Mono function) OXT-212 | Acid breeding agent Compound 1 | Thermal base generating Thermal base 1 | Light thermal oxide generating agent Initiator 2 | Photo oxide generating agent SP152 |
|---|---|---|---|---|---|---|---|---|---|
| K  | C1 | 5.0 | 15.4 | 40.0 | 30.0 | 3.0 | 0.1 | 1.5 | 5.0 |
| C  | C2 | 2.5 | 11.9 | 50.0 | 30.0 | 1.5 | 0.1 | 1.0 | 3.0 |
| M  | C3 | 3.0 | 11.4 | 50.0 | 30.0 | 1.5 | 0.1 | 1.0 | 3.0 |
| Y  | C4 | 2.5 | 11.9 | 50.0 | 30.0 | 1.5 | 0.1 | 1.0 | 3.0 |
| W  | C5 | 5.0 | 18.9 | 40.0 | 30.0 | 1.5 | 0.1 | 1.0 | 3.0 |
| Lk | C1 | 1.3 | 13.2 | 50.0 | 30.0 | 1.5 | 0.1 | 1.0 | 3.0 |
| Lc | C2 | 0.6 | 13.8 | 50.0 | 30.0 | 1.5 | 0.1 | 1.0 | 3.0 |
| Lm | C3 | 0.8 | 13.7 | 50.0 | 30.0 | 1.5 | 0.1 | 1.0 | 3.0 |
| Ly | C4 | 0.6 | 13.8 | 50.0 | 30.0 | 1.5 | 0.1 | 1.0 | 3.0 |

C1–C5: Coloring material 1–coloring material 5

TABLE 6

Ink composition set 6 (comparative example)

Ink composition (mass %)

| | | | | Photo polymerization compound | | | Acid | | Thermal base | Light thermal | Photo |
| | | | | | Oxetane compound | | | | | | |
| Kind of inks | Coloring material Kind | Coloring material Additional amount | Epoxidation linseed oil *E | (2 functions) OXT-121 | (2 functions) OXT-221 | (Mono function) OXT-211 | breeding agent Compound 2 | Basic compound *1 | generating agent Thermal base 2 | oxide generating agent Initiator 3 | oxide generating agent Initiator 4 |
|---|---|---|---|---|---|---|---|---|---|---|---|
| K | C1 | 5.0 | 16.9 | 10.0 | 30.0 | 30.0 | 3.0 | 0.01 | 0.1 | 2.5 | 2.5 |
| C | C2 | 2.5 | 19.4 | 10.0 | 30.0 | 30.0 | 3.0 | 0.01 | 0.1 | 2.5 | 2.5 |
| M | C3 | 3.0 | 18.9 | 10.0 | 30.0 | 30.0 | 3.0 | 0.01 | 0.1 | 2.5 | 2.5 |
| Y | C4 | 2.5 | 19.4 | 10.0 | 30.0 | 30.0 | 3.0 | 0.01 | 0.1 | 2.5 | 2.5 |
| W | C5 | 5.0 | 16.9 | 10.0 | 30.0 | 30.0 | 3.0 | 0.01 | 0.1 | 2.5 | 2.5 |
| Lk | C1 | 1.3 | 20.6 | 10.0 | 30.0 | 30.0 | 3.0 | 0.01 | 0.1 | 2.5 | 2.5 |
| Lc | C2 | 0.6 | 21.3 | 10.0 | 30.0 | 30.0 | 3.0 | 0.01 | 0.1 | 2.5 | 2.5 |
| Lm | C3 | 0.8 | 21.1 | 10.0 | 30.0 | 30.0 | 3.0 | 0.01 | 0.1 | 2.5 | 2.5 |
| Ly | C4 | 0.6 | 21.3 | 10.0 | 30.0 | 30.0 | 3.0 | 0.01 | 0.1 | 2.5 | 2.5 |

C1–C5: Coloring material 1–coloring material 5

The details of each ink and each compound described in Tables 1–6 are as follows.

K: dark black ink

C: dark cyan ink

M: dark magenta ink

Y: dark yellow ink

W: white ink

Lk: light black ink

Lc: light cyan ink

Lm: light magenta ink

Ly: light yellow ink

Coloring material 1: C.I. pigment Black-7

Coloring material 2: C.I. pigment Blue-15:3

Coloring material 3: C.I. pigment Red-57:1

Coloring material 4: C.I. pigment Yellow-13

Coloring material 5: titanium oxide (anataze type average particle diameter 0.2 μm)

*A: Seloxide 3000 Daisel Chemical Co. made

*B: Seloxide 2021P Daisel Chemical Co. made

*C: Vikoflex 7010 ATOFINA Co. made (epoxidized soybean oil)

*D: Vikoflex 9040 ATOFINA Co. made (epoxidized linseed oil)

*E: Vikoflex 9010 ATOFINA Co. made (epoxidized linseed oil)

OXT-121: Toa Gosei Chem. co. made

OXT-211: Toa Gosei Chem. co. made

OXT-212* Toa Gosei Chem. co. made

OXT-221: Toa Gosei Chem. co. made

Acpres 11: Nippon chemics co. made

SP152: Asahi Denka co. made

CS-7102: Nippon Soda co. made

CI-5102: Nippon Soda co. made

CGI552: Chiba·speciality·chem. co. made

*1: N-ethyl di-ethanol amine

*2: tri-butyl amine

*3: di-ethyl thioxanthone

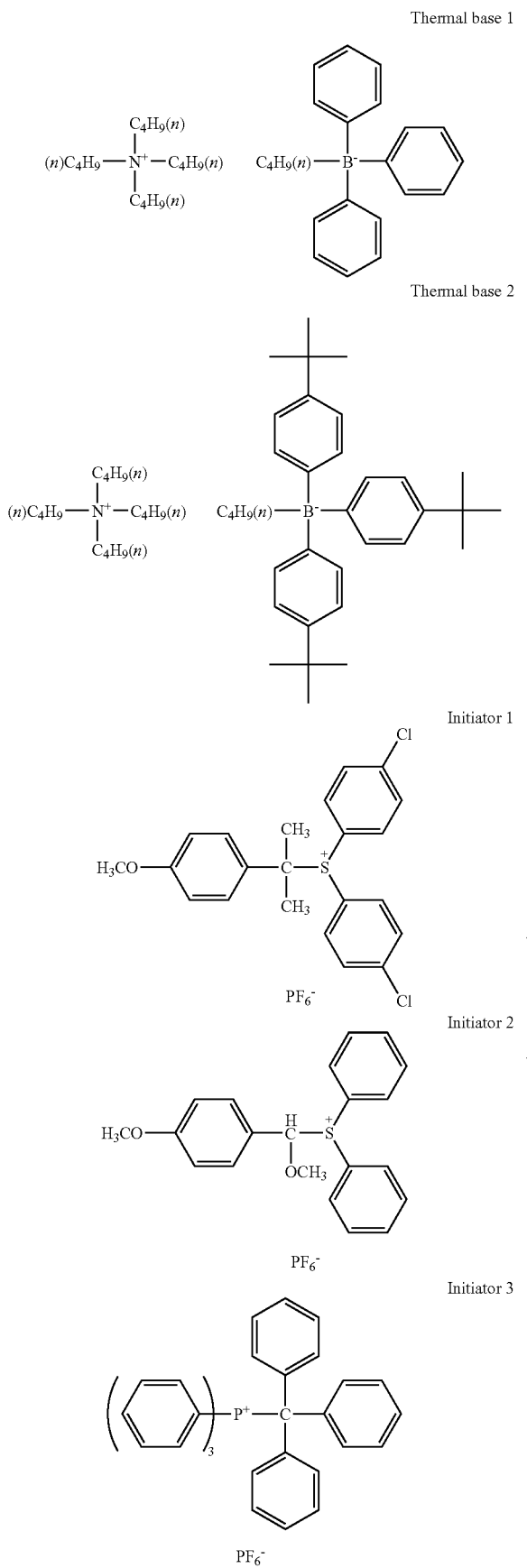

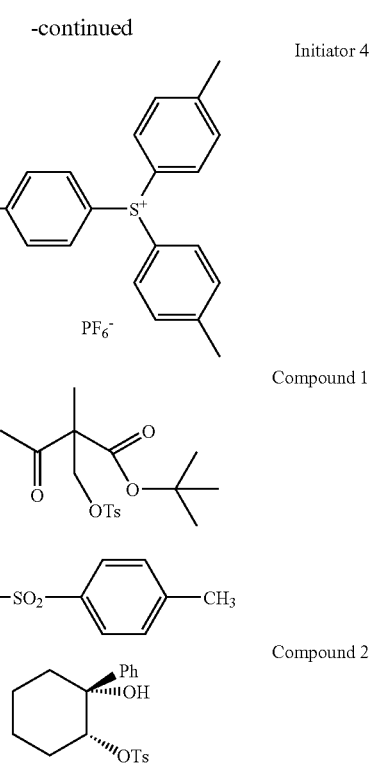

(Ink-jet Recording Method)

Above-described adjusted each ink composition set is loaded in the ink-jet recording apparatus composed of the structure described in FIG. 1 provided with the piezoelectric type ink-jet nozzle, and following each image recording is continuously conducted on each recording material having each surface energy described in Tables 7, 8, which is a long size of width 600 mm, and length 1000 m. The ink supply system is composed of an ink tank, supply pipe, front chamber ink tank just before the head, piping with a filter, and piezoelectric head, and a portion from the front chamber tank to the head portion, is heat-insulated, and the heat is added to 50° C. The piezoelectric head is driven in such a manner that a multi-sized dot of 2–15 pl can be jetted in the resolution of 720×720 dpi, and each ink is continuously jetted. After the ink impacts, for the samples 1–2, the hardening processing is conducted after 0.2 sec, or for samples 22–49, the hardening processing is conducted after 0.1 sec, under the irradiation condition described in Tables 7 and 8. Further, after the ink drop impacts, each recording material is heated by the heating plate provided in the conveying section described in FIG. 1, and the system is made so that the surface temperature described in Tables 7 and 8, is obtained. After the recording, when the total ink film thickness is measured, it is within the range of 2.3–13 μm. In this connection, dpi used in the present invention means the number of dots per 2.54 cm. Hereupon, the formation of the ink-jet image is respectively conducted according to the above methods under the environment of 10° C., 20% RH, under the environment of 25° C., 50% RH, and under the environment of 32° C., 80% RH.

TABLE 7

| | | Recording material | | | Irradiation condition | | | | | | |
|---|---|---|---|---|---|---|---|---|---|---|---|
| | | | | | | | | On recording material surface | | Irradiation light source condition | | |
| Sample No. | Ink set No. | Kind | Surface energy mN/m | Recording material surface temperature (° C.) | Kind of irradiation light source | Irradiation position | Irradiation method (area) Light source | Peak wave-length (nm) | Max. illumination mW/cm² | Peak wave-length nm | Energy mJ/cm² | Note |
| 1 | 1 | OPP | 38 | 50 | 1 | *1 | *7 | 365 | 650 | 365 | 180 | Com. |
| 2 | 1 | PET | 53 | 50 | 1 | *1 | *7 | 365 | 650 | 365 | 180 | Com. |
| 3 | 1 | ONy | 48 | 50 | 1 | *1 | *7 | 365 | 650 | 365 | 180 | Com. |
| 4 | 1 | PVC | 45 | 50 | 1 | *1 | *7 | 365 | 650 | 365 | 180 | Com. |
| 5 | 1 | *2 | 39 | 50 | 1 | *1 | *7 | 365 | 650 | 365 | 180 | Com. |
| 6 | 1 | *3 | *5 | 50 | 1 | *1 | *7 | 365 | 650 | 365 | 180 | Com. |
| 7 | 1 | *4 | *5 | 50 | 1 | *1 | *7 | 365 | 650 | 365 | 180 | Com. |
| 8 | 2 | OPP | 38 | *6 | 1 | *1 | *7 | 365 | 650 | 365 | 180 | Com. |
| 9 | 2 | PET | 53 | *6 | 1 | *1 | *7 | 365 | 650 | 365 | 180 | Com. |
| 10 | 2 | ONy | 48 | *6 | 1 | *1 | *7 | 365 | 650 | 365 | 180 | Com. |
| 11 | 2 | PVC | 45 | *6 | 1 | *1 | *7 | 365 | 650 | 365 | 180 | Com. |
| 12 | 2 | *2 | 39 | *6 | 1 | *1 | *7 | 365 | 650 | 365 | 180 | Com. |
| 13 | 2 | *3 | *5 | *6 | 1 | *1 | *7 | 365 | 650 | 365 | 180 | Com. |
| 14 | 2 | *4 | *5 | *6 | 1 | *1 | *7 | 365 | 650 | 365 | 180 | Com. |
| 15 | 2 | OPP | 38 | 50 | 1 | *1 | *7 | 365 | 650 | 365 | 180 | Inv. |
| 16 | 2 | PET | 53 | 50 | 1 | *1 | *7 | 365 | 650 | 365 | 180 | Inv. |
| 17 | 2 | ONy | 48 | 50 | 1 | *1 | *7 | 365 | 650 | 365 | 180 | Inv. |
| 18 | 2 | PVC | 45 | 50 | 1 | *1 | *7 | 365 | 650 | 365 | 180 | Inv. |
| 19 | 2 | *2 | 39 | 50 | 1 | *1 | *7 | 365 | 650 | 365 | 180 | Inv. |
| 20 | 2 | *3 | *5 | 50 | 1 | *1 | *7 | 365 | 650 | 365 | 180 | Inv. |
| 21 | 2 | *4 | *5 | 50 | 1 | *1 | *7 | 365 | 650 | 365 | 180 | Inv. |
| 22 | 3 | OPP | 38 | 50 | 2 | *1 | *8 | 365 | 15 | 365 | 45 | Inv. |
| 23 | 3 | PET | 53 | 50 | 2 | *1 | *8 | 365 | 15 | 365 | 45 | Inv. |
| 24 | 3 | ONy | 48 | 50 | 2 | *1 | *8 | 365 | 15 | 365 | 45 | Inv. |
| 25 | 3 | PVC | 45 | 50 | 2 | *1 | *8 | 365 | 15 | 365 | 45 | Inv. |
| 26 | 3 | *2 | 39 | 50 | 2 | *1 | *8 | 365 | 15 | 365 | 45 | Inv. |
| 27 | 3 | *3 | *5 | 50 | 2 | *1 | *8 | 365 | 15 | 365 | 45 | Inv. |
| 28 | 3 | *4 | *5 | 50 | 2 | *1 | *8 | 365 | 15 | 365 | 45 | Inv. |

*1: Both ends of recording head
*2: Shrink OPS
*3: Chass coat paper
*4: Japanese paper
*5: Water absorptive material
*6: Without heating
*7: Line light source
*8: 8 line light sources
Com.: Comparative example
Inv.: Present invention

TABLE 8

| | | Recording material | | | Irradiation condition | | | | | | |
|---|---|---|---|---|---|---|---|---|---|---|---|
| | | | | | | | | On recording material surface | | Irradiation light source condition | | |
| Sample No. | Ink set No. | Kind | Surface energy mN/m | Recording material surface temperature (° C.) | Kind of irradiation light source | Irradiation position | Irradiation method (area) Light source | Peak wave-length (nm) | Max. illumination mW/cm² | Peak wave-length nm | Energy mJ/cm² | Note |
| 29 | 4 | OPP | 38 | 60 | 3 | *1 | *7 | 365 | 10 | 365 | 30 | Inv. |
| 30 | 4 | PET | 53 | 60 | 3 | *1 | *7 | 365 | 10 | 365 | 30 | Inv. |
| 31 | 4 | ONy | 48 | 60 | 3 | *1 | *7 | 365 | 10 | 365 | 30 | Inv. |
| 32 | 4 | PVC | 45 | 60 | 3 | *1 | *7 | 365 | 10 | 365 | 30 | Inv. |
| 33 | 4 | *2 | 39 | 60 | 3 | *1 | *7 | 365 | 10 | 365 | 30 | Inv. |
| 34 | 4 | *3 | *5 | 60 | 3 | *1 | *7 | 365 | 10 | 365 | 30 | Inv. |
| 35 | 4 | *4 | *5 | 60 | 3 | *1 | *7 | 365 | 10 | 365 | 30 | Inv. |
| 36 | 5 | OPP | 38 | 60 | 2 | *1 | *8 | 365 | 12 | 365 | 38 | Inv. |
| 37 | 5 | PET | 53 | 60 | 2 | *1 | *8 | 365 | 12 | 365 | 38 | Inv. |

TABLE 8-continued

| | | Recording material | Recording material | Kind of irradiation | Irradiation method (area) | | On recording material surface | | Irradiation light source condition | | |
|---|---|---|---|---|---|---|---|---|---|---|---|
| Sample No. | Ink set No. | Kind | Surface energy mN/m | surface temperature (° C.) | light source | Irradiation position | Light source | Peak wave-length (nm) | Max. illumination mW/cm² | Peak wave-length nm | Energy mJ/cm² | Note |
| 38 | 5 | ONy | 48 | 60 | 2 | *1 | *8 | 365 | 12 | 365 | 38 | Inv. |
| 39 | 5 | PVC | 45 | 60 | 2 | *1 | *8 | 365 | 12 | 365 | 38 | Inv. |
| 40 | 5 | *2 | 39 | 60 | 2 | *1 | *8 | 365 | 12 | 365 | 38 | Inv. |
| 41 | 5 | *3 | *5 | 60 | 2 | *1 | *8 | 365 | 12 | 365 | 38 | Inv. |
| 42 | 5 | *4 | *5 | 60 | 2 | *1 | *8 | 365 | 12 | 365 | 38 | Inv. |
| 43 | 6 | OPP | 38 | 60 | 2 | *1 | *8 | 365 | 12 | 365 | 38 | Inv. |
| 44 | 6 | PET | 53 | 60 | 2 | *1 | *8 | 365 | 12 | 365 | 38 | Inv. |
| 45 | 6 | ONy | 48 | 60 | 2 | *1 | *8 | 365 | 12 | 365 | 38 | Inv. |
| 46 | 6 | PVC | 45 | 60 | 2 | *1 | *8 | 365 | 12 | 365 | 38 | Inv. |
| 47 | 6 | *2 | 39 | 60 | 2 | *1 | *8 | 365 | 12 | 365 | 38 | Inv. |
| 48 | 6 | *3 | *5 | 60 | 2 | *1 | *8 | 365 | 12 | 365 | 38 | Inv. |
| 49 | 6 | *4 | *5 | 60 | 2 | *1 | *8 | 365 | 12 | 365 | 38 | Inv. |

*1: Both ends of recording head
*2: Shrink OPS
*3: Chass coat paper
*4: Japanese paper
*5: Water absorptive material
*7: 3 line light sources
*8: 8 line light sources
Inv.: Present invention The details of the abbreviated name of each recording material described in Tables 7 and 8 are as follows.

| | |
|---|---|
| OPP: | oriented polypropylene |
| PET: | polyethylene terephthalate |
| ONy: | oriented nylon |
| PVC: | polyvinyl chloride |
| shrink OPS: | shrink-like oriented polystyrene |

Further, details of the irradiation light sources described in Tables 7 and 8 are as follows.

Irradiation light source 1: 120 W/cm metal halide lamp (Nippon Denchi Co. made MAL 400 NL the electric power of the power source 3 kW/hr)

irradiation light source 2: cold cathode tube (Hipec co. made the electric power of the power source, not large than 1 kW/hr)

irradiation light source 3: fluorescent lamp (Nippo denki special ordered device, the electric power of the power source, not large than 1 kW/hr)

(Evaluation of the Ink-jet Recording Image)

For each image recorded by the above image forming method, following each evaluation is conducted. In this connection, each evaluation is conducted for the above-described 3 printing environments.

(Evaluation of the Character Quality)

In each color of Y, M, C, K, 6 point MS Mincho-type character is printed at the target density, and the roughness of the character is enlarged and observed by the loupe, and evaluation of the character quality is conducted according to the following references.

A . . . no roughness

B . . . very small roughness

C . . . roughness is seen, but a level at which it can be discriminated as a character.

D . . . very much roughness, and a level at which the character is blurred and can not be used (Evaluation of Color Mixing (Bleeding))

Adjoining each color dot in the printed high minute image is enlarged by the loupe, and the bleeding status is visually evaluated, and the evaluation of the color mixing is conducted according to the following references.

A . . . adjoining dot shapes maintain the true circle and have no bleeding

B . . . adjoining dot shapes maintain almost the true circle and have almost no bleeding.

C . . . adjoining dots are little bled and the dot shape is little broken, and a level at which the dot is within the allowable range.

D . . . adjoining dots are bled and mixed, and a level at which the dot can not be used.

Each of evaluated results obtained by the above description will be shown in Tables 9 and 10.

TABLE 9

| Sample | 10° C. · 20% RH Character quality | 10° C. · 20% RH Color mixing | 25° C. · 50% RH Character quality | 25° C. · 50% RH Color mixing | 32° C. · 80% RH Character quality | 32° C. · 80% RH Color mixing | Note |
|---|---|---|---|---|---|---|---|
| 1 | D | C | D | C | D | C | Com. |
| 2 | C | C | C | D | C | D | Com. |
| 3 | C | C | C | D | C | D | Com. |
| 4 | C | C | D | D | D | D | Com. |
| 5 | D | C | D | C | D | C | Com. |
| 6 | C | C | D | D | D | D | Com. |
| 7 | D | D | D | D | D | D | Com. |
| 8 | C | C | C | C | D | C | Com. |
| 9 | C | B | C | C | C | D | Com. |
| 10 | B | C | C | C | C | D | Com. |
| 11 | B | B | C | C | C | D | Com. |
| 12 | C | C | C | C | D | C | Com. |
| 13 | B | A | B | B | C | C | Com. |
| 14 | B | B | C | C | D | D | Com. |
| 15 | C | B | C | A | B | B | Inv. |
| 16 | B | C | B | B | A | B | Inv. |
| 17 | B | B | B | B | A | B | Inv. |
| 18 | B | B | B | B | B | B | Inv. |
| 19 | C | B | C | A | B | B | Inv. |
| 20 | B | B | B | B | B | B | Inv. |
| 21 | C | B | C | B | B | B | Inv. |
| 22 | B | A | B | A | B | A | Inv. |
| 23 | A | A | A | B | A | B | Inv. |
| 24 | A | A | A | A | A | B | Inv. |
| 25 | A | B | A | B | B | B | Inv. |
| 26 | A | A | B | A | B | A | Inv. |
| 27 | A | A | A | A | A | B | Inv. |
| 28 | B | B | B | B | B | B | Inv. |

Com.: Comparative example
Inv.: Present invention

TABLE 10

| Sample | 10° C. · 20% RH Character quality | 10° C. · 20% RH Color mixing | 25° C. · 50% RH Character quality | 25° C. · 50% RH Color mixing | 32° C. · 80% RH Character quality | 32° C. · 80% RH Color mixing | Note |
|---|---|---|---|---|---|---|---|
| 29 | B | B | B | B | C | B | Inv. |
| 30 | A | B | B | B | B | B | Inv. |
| 31 | A | A | B | B | B | B | Inv. |
| 32 | A | A | B | A | B | B | Inv. |
| 33 | B | B | B | B | C | B | Inv. |
| 34 | B | B | B | B | B | B | Inv. |
| 35 | B | B | C | B | C | B | Inv. |
| 36 | B | A | B | A | B | A | Inv. |
| 37 | A | A | A | B | A | B | Inv. |
| 38 | A | A | A | A | A | B | Inv. |
| 39 | A | B | A | B | B | B | Inv. |
| 40 | A | B | A | A | B | A | Inv. |
| 41 | A | A | A | A | A | B | Inv. |
| 42 | B | B | B | B | B | B | Inv. |
| 43 | B | A | B | A | B | A | Inv. |
| 44 | A | A | A | B | A | B | Inv. |
| 45 | A | A | A | A | A | B | Inv. |
| 46 | A | B | A | B | A | B | Inv. |
| 47 | B | A | B | A | B | A | Inv. |
| 48 | A | A | A | A | A | B | Inv. |
| 49 | B | B | B | B | B | B | Inv. |

Com.: Comparative example
Inv.: Present invention

As can be clearly seen from Tables 9 and 10, the image recording method using the ink composition set according to the present invention, can record the high minute image whose character quality is excellent and in which the color mixing is not generated even in the various printing environment from the low temperature and low humidity to the high temperature and high humidity as the printing environment, on all recording materials.

EFFECTS OF THE INVENTION

According to the present invention, even under various printing environments, there can be provided the image forming method and recording apparatus by the ink-jet recording method by which the high minute image whose character quality is excellent, and in which there is no color-mixing can be very stably recorded.

What is claimed is:

1. An ink-jet recording method comprising:
   jetting an active ray-hardenable ink from an ink-jet head onto a recording material;
   irradiating the jetted active ray-hardenable ink on the recording material with an active ray; and
   heating the jetted active ray-hardenable ink on the recording material to a temperature of 40–80° C.,
   wherein the active ray-hardenable ink comprises:
   (i) an oxetane compound having one oxetane ring in the molecule; and
   (ii) an oxetane compound having two or more oxetane rings in the molecule.

2. The ink-jet recording method of claim 1, wherein the irradiating step is conducted between 0.001 to 2.0 sec after the jetted ink reaches on the recording material.

3. The inkjet recording method of claim 1, wherein a total thickness of jetted ink on the recording material after irradiating step is 2 to 20 μm.

4. The inkjet recording method of claim 1, wherein an amount of each ink drop of the active ray-hardenable ink jetted from the inkjet head is 2 to 15 pl.

5. The inkjet recording method of claim 1, wherein the active ray-hardenable ink comprises a photo acid generating agent and comprises no photo polymerizable compound other than the oxetane compounds.

6. The ink-jet recording method of claim 5, the photo acid-generating agent is a sulfonium compound.

7. The ink-jet recording method of claim 1, wherein in the jetting step, two or more of the active ray-hardenable inks are jetted and at least one of the active ray-hardenable ink is white ink.

8. The ink-jet recording method of claim 1, wherein the recording material is a nonabsorbable recording material.

9. The ink-jet recording method of claim 8, wherein the nonabsorbable recording material has a surface energy of 35 to 60 dyn/cm.

10. The ink-jet recording method of claim 1, wherein in the jetting step, a temperature of the active ray-hardenable ink is controlled within 35 to 100° C.

11. The ink-jet recording method of claim 1, wherein the active ray-hardenable ink has a viscosity of 7 to 50 mPa·s under 25° C.

12. The ink-jet recording method of claim 1, wherein the active ray-hardenable ink comprises the oxetane compound having one oxetane ring in the molecule in an amount of 5 to 50 weight % of a total ink weight and comprises the oxetane compound having two or more oxetane rings in the molecule in an amount of 4 to 80 weight % of the total ink weight.

13. The inkjet recording method of claim 1, wherein the active ray-hardenable ink contains no solvent.

* * * * *